United States Patent
Yang et al.

(10) Patent No.: US 12,085,339 B2
(45) Date of Patent: Sep. 10, 2024

(54) APPARATUS FOR CALCINING SECONDARY BATTERY CATHODE MATERIAL

(71) Applicants: POSCO, Pohang-si (KR); RESEARCH INSTITUTE OF INDUSTRIAL SCIENCE & TECHNOLOGY, Pohang-si (KR); POSCO CHEMICAL CO., LTD, Pohang-si (KR)

(72) Inventors: Choongmo Yang, Pohang-si (KR); Keeyoung Jung, Pohang-si (KR); Yooncheol Park, Pohang-si (KR); Yeong Woo Kim, Pohang-si (KR); Soon Cheol Hwang, Pohang-si (KR)

(73) Assignees: POSCO, Pohang-si (KR); RESEARCH INSTITUTE OF INDUSTRIAL SCIENCE & TECHNOLOGY, Pohang-si (KR); POSCO CHEMICAL CO., LTD, Pohang-si (KR)

( * ) Notice: Subject to any disclaimer, the term of this patent is extended or adjusted under 35 U.S.C. 154(b) by 0 days.

(21) Appl. No.: 17/787,769

(22) PCT Filed: Dec. 1, 2020

(86) PCT No.: PCT/KR2020/017412
§ 371 (c)(1),
(2) Date: Jun. 21, 2022

(87) PCT Pub. No.: WO2021/125629
PCT Pub. Date: Jun. 24, 2021

(65) Prior Publication Data
US 2023/0074546 A1    Mar. 9, 2023

(30) Foreign Application Priority Data

Dec. 20, 2019  (KR) .................... 10-2019-0171749

(51) Int. Cl.
*F27B 9/36*    (2006.01)
*B01J 19/00*   (2006.01)
(Continued)

(52) U.S. Cl.
CPC ............. *F27B 9/36* (2013.01); *B01J 19/0006* (2013.01); *F27B 9/2407* (2013.01); *F27B 9/26* (2013.01); *F27B 9/3005* (2013.01); *F27B 9/32* (2013.01)

(58) Field of Classification Search
CPC ................................ F27B 9/26; F27B 9/3016
See application file for complete search history.

(56) References Cited

U.S. PATENT DOCUMENTS

2008/0008976 A1    1/2008  Okano

FOREIGN PATENT DOCUMENTS

| JP | 2010-216737 A | 9/2010 |
| JP | 2013-160423 A | 8/2013 |

(Continued)

OTHER PUBLICATIONS

WO-2019107651-A1 English translation (Year: 2019).*

(Continued)

*Primary Examiner* — Steven S Anderson, II
*Assistant Examiner* — Kurt J Wolford
(74) *Attorney, Agent, or Firm* — Sughrue Mion, PLLC

(57) ABSTRACT

An apparatus for calcining a secondary battery cathode material includes: a calcination furnace including an inner space that includes a temperature rising space, a temperature maintaining space, and a cooling space, which sequentially communicate; a plurality of rollers for transferring a sagger, in which a cathode material is accommodated, from the temperature rising space to the cooling space via the temperature maintaining space; a plurality of heaters arranged along the inner space; a plurality of gas feeding parts for (Continued)

feeding gas to the inner space; and a plurality of exhaust parts for exhausting gas from the inner space, wherein the cross-sectional area of the temperature maintaining space is smaller than the cross-sectional area of the temperature rising space and the cross-sectional area of the cooling space.

4 Claims, 3 Drawing Sheets

(51) Int. Cl.
*F27B 9/24* (2006.01)
*F27B 9/26* (2006.01)
*F27B 9/30* (2006.01)
*F27B 9/32* (2006.01)

(56) References Cited

FOREIGN PATENT DOCUMENTS

| JP | 2014145566 A | * | 8/2014 | |
| JP | 2015-064189 A | | 4/2015 | |
| JP | 2018-169137 A | | 11/2018 | |
| JP | 2021-504912 A | | 2/2021 | |
| KP | 10-2018-0074127 A | | 7/2018 | |
| KR | 10-2015-0039651 A | | 4/2015 | |
| KR | 10-2016-0115495 A | | 10/2016 | |
| KR | 10-2019-0064850 A | | 6/2019 | |
| KR | 10-1993209 B1 | | 6/2019 | |
| KR | 10-2021-0079695 A | | 6/2021 | |
| WO | 2012/025818 A1 | | 3/2012 | |
| WO | 2012/025819 A1 | | 3/2012 | |
| WO | WO-2019107651 A1 | * | 6/2019 | ............. B22F 3/003 |

OTHER PUBLICATIONS

JP-2014145566-A English translation (Year: 2014).*
Thermal 6 Corporation, Temperature vs Heat Loss In a Heater (Year: 2019).*
Written Opinion for PCT/KR2020/017412, dated Mar. 11, 2021.
International Search Report for PCT/KR2020/017412, dated Mar. 11, 2021.
Notice of Allowance issued Aug. 1, 2023 in Japanese Application No. 2022-538290.
Extended European Search Report issued Jun. 14, 2023 in European Application No. 20903138.4.

* cited by examiner

FIG. 3

| Calculation Case | Area rate of sagger window [%] | Flow inflow to sagger / total supply flow [%] | Mass fraction of carbon dioxide |
|---|---|---|---|
| Comparative example cross-section | 4.25 | 3.2 | 0.020~0.079 |
| Experimental example cross-section | 18.90 | 16.6 | 0.012~0.034 |

# APPARATUS FOR CALCINING SECONDARY BATTERY CATHODE MATERIAL

CROSS REFERENCE TO RELATED APPLICATIONS

This application is a National Stage of International Application No. PCT/KR2020/017412 filed Dec. 1, 2020, claiming priority based on Korean Patent Application No. 10-2019-0171749 filed Dec. 20, 2019, the entire disclosures of which are incorporated herein by reference.

TECHNICAL FIELD

The present disclosure relates to an apparatus for calcining a secondary battery cathode material.

BACKGROUND ART

In general, an apparatus for calcining a cathode material of a secondary battery calcines a sagger where a cathode material is accommodated in a calcination furnace at about 400 degrees to 1100 degrees according to characteristics of the material.

In a calcination process using the apparatus for calcining the secondary battery cathode material, aqueous vapor and carbon dioxide gas are generated from the cathode material stored in the sagger, and in the case of carbon dioxide gas, it is difficult to release to the outside of the sagger because of its molecular weight compared to oxygen or air used to control the calcination furnace atmosphere. Carbon dioxide gas remaining inside the sagger causes a chemical reaction with a lithium oxide on a positive active material surface calcinated from the cathode material to produce lithium carbonate.

A conventional apparatus for calcining a secondary battery cathode material discharges aqueous vapor and carbon dioxide gas generated from the cathode material accommodated in the sagger to the outside of the sagger, and at the same time, for the calcination reaction, gases such as oxygen and air are supplied to the lower, upper, and side of the calcination space where the sagger is positioned.

However, in the conventional apparatus for calcining a secondary battery cathode material, the cross-section of the window of the sagger through which gas inflows from the outside of the sagger to the inside of the sagger is very small compared to the cross-section of the calcination space where the sagger is positioned, and thus there is a problem that only a very small amount of the entire flow of gas passing through the cross-section of the space inflows into the inside of the sagger.

DISCLOSURE

An embodiment is to provide an apparatus for calcining a secondary battery cathode material, which improves the carbon dioxide gas emission from the inside of the sagger by increasing the flow rate of gas flowing into the sagger accommodating the secondary battery cathode material, while simultaneously improving the calcination reaction of the secondary battery cathode material accommodated in the sagger.

One aspect provides an apparatus for calcining a secondary battery cathode material, including: a calcination furnace including an inner space that includes a temperature rising space, a temperature maintaining space, and a cooling space that are sequentially communicated with each other; a plurality of rollers that are disposed along the inner space and transport the sagger accommodating the cathode material from the temperature rising space to the cooling space through the temperature maintaining space; a plurality of heaters disposed along the inner space with the plurality of rollers interposed therebetween; a plurality of gas feeding parts connected to the inner space and supplying gas to the inner space; and a plurality of exhaust parts connected to the inner space and exhausting gas from the inner space, wherein a cross-section of the temperature maintaining space is smaller than a cross-section of the temperature rising space and a cross-section of the cooling space.

The first inner wall of the calcination furnace forming the temperature maintaining space may be closer to the plurality of rollers compared to the second inner wall of the calcination furnace forming the temperature rising space and the third inner wall of the calcination furnace forming the cooling space.

The plurality of heaters may include: first heaters positioned inside the first inner wall; second heaters positioned in the temperature rising space while being spaced apart from the second inner wall; and third heaters positioned in the cooling space while being spaced apart from the third inner wall.

The first heaters may have a smaller capacity than the second heaters and the third heaters.

The apparatus for calcining the secondary battery cathode material may further include: a first partitioning wall that extends in a vertical direction from the second inner wall of the calcination furnace; and a second partitioning wall that extends in the vertical direction from the third inner wall of the calcination furnace, wherein an end of the first partitioning wall and an end of the second partitioning wall may be positioned on the horizontal line with the second inner wall.

The plurality of gas feeding parts may include: a first gas feeding part connected to a lower portion of the temperature rising space; a second gas feeding part connected to a lower portion of the temperature maintaining space; and a third gas feeding part connected to a lower portion of the cooling space.

The plurality of exhaust parts may include: a first exhaust part connected with an upper portion of the temperature rising space; and a second exhaust part connected with an upper portion of the cooling space.

According to the embodiment, the apparatus for calcining the secondary battery cathode material, which improves the carbon dioxide gas emission from the inside of the sagger by increasing the flow rate of gas flowing into the sagger accommodating the secondary battery cathode material, while simultaneously improving the calcination reaction of the secondary battery cathode material accommodated in the sagger, can be provided.

DESCRIPTION OF THE DRAWINGS

FIG. 3 is a table that shows an experiment results of the cross-section of the comparative example and the cross-section of the experimental example of FIG. 2.

MODE FOR INVENTION

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

In order to clearly explain the present invention, parts without description and relationship are omitted, and the same reference signs are designated to the same or similar constituent elements throughout the specification.

In addition, unless explicitly described to the contrary, the word "comprise", and variations such as "comprises" or "comprising", will be understood to imply the inclusion of stated elements but not the exclusion of any other elements.

Hereinafter, referring to FIG. 1, an apparatus for calcining a secondary battery cathode material according to an embodiment will be described.

Figure 1:
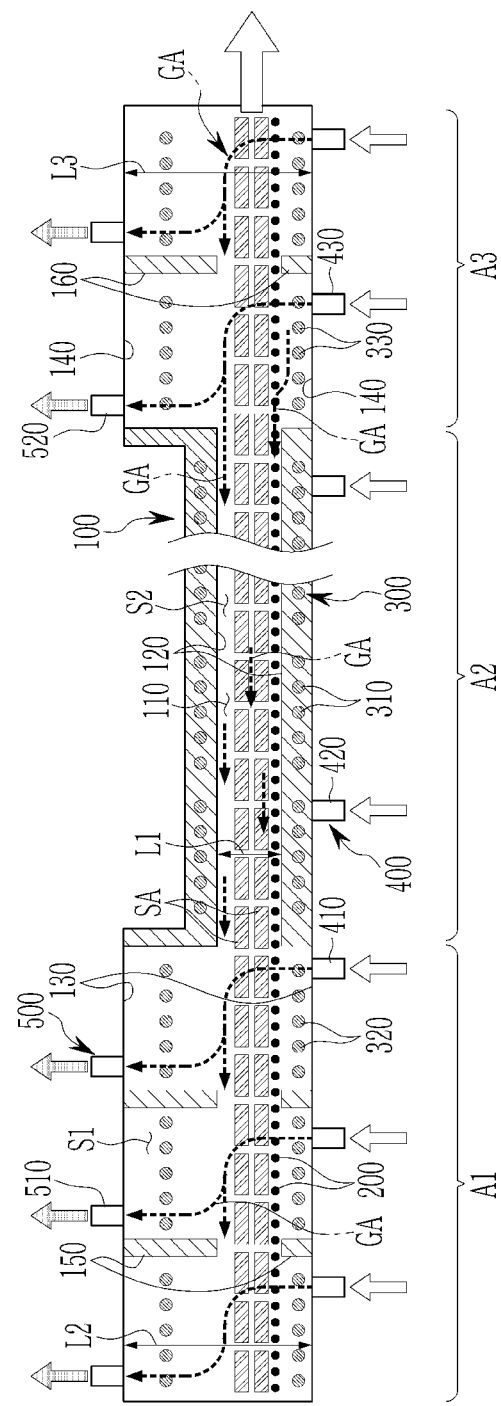
FIG. 1 shows an apparatus for calcining a secondary battery cathode material according to an embodiment.

FIG. 1 shows an apparatus for calcining a secondary battery cathode material according to an embodiment.

Referring to FIG. 1, an apparatus for calcining a secondary battery cathode material according to an embodiment calcinates the secondary battery cathode material stored in the sagger SA by heating the sagger SA containing the secondary battery cathode material while moving the sagger SA in one direction in an inner space 110 of the calcination furnace 100. In the embodiment, the sagger SA is stacked as a multi-layer, but is not limited thereto and may be provided as a single layer.

The apparatus for calcining the secondary battery cathode material includes a temperature rising section A1, a temperature maintaining section A2, and a cooling section A3.

The temperature rising section A1 is a section in which the temperature is raised to a predetermined temperature (for example, 400 degrees to 1100 degrees) according to the characteristics of the secondary battery cathode material accommodated in the sagger SA.

The temperature maintaining section A2 is a section to maintain the predetermined temperature.

The cooling section A3 is a section cooled from a predetermined temperature.

The apparatus for calcining the secondary battery cathode material includes a calcination furnace 100 that forms the temperature rising section A1, the temperature maintaining section A2, the cooling section A3, a plurality of rollers 200, a plurality of heaters 300, a plurality of gas feeding parts 400, and a plurality of exhaust parts 500.

The calcination furnace 100 includes an inner space 110, a first inner wall 120, a second inner wall 130, a third inner wall 140, a first partitioning wall 150, and a second partitioning wall 160.

The inner space 110 is a space in which the sagger SA in which the cathode material is accommodated is moved in one direction, and includes a temperature rising space S1, a temperature maintaining space S2, and a cooling space S3 that sequentially communicate with each other along the one direction.

The temperature rising space S1 is a space corresponding to the temperature rising section A1. The cross-section of the temperature rising space S1 is larger than the cross-section of the temperature maintaining space S2.

The temperature maintaining space S2 communicates with the temperature rising space S1 and corresponds to the temperature maintaining section A2. The cross-section of the temperature maintaining space S2 is smaller than the cross-section of the temperature rising space S1 and the cross-section of the cooling space S3.

The cooling space S3 communicates with the temperature maintaining space S2 and corresponds to the cooling section A3. The cross-section of the cooling space S3 is larger than that of the temperature maintaining space S2. The first inner wall 120 forms the temperature maintaining space S2.

The first inner wall 120 is an inner wall of the lower wall, upper wall, and sidewall forming the temperature maintaining space S2. A first height L1 of the temperature maintaining space S2 formed by the first inner wall 120 is shorter than a second height L2 of the temperature rising space S1 formed by the second inner wall 130 and a third height L3 of the cooling space S3 formed by the third inner wall 140.

The first inner wall 120 is positioned closer to the rollers 200 compared to the second inner wall 130 and third inner wall 140.

The second inner wall 130 forms the temperature rising space S1. The second inner wall 130 is an inner wall of the lower wall, upper wall, and sidewall forming the temperature rising space S1. The second height L2 of the temperature rising space S1 formed by the second inner wall 130 is longer than the first height L1 of the temperature maintaining space S2 formed by the first inner wall 120.

The second inner wall 130 is positioned farther from the rollers 200 compared to the first inner wall 120.

The third inner wall 140 forms the cooling space S3. The third inner wall 140 is an inner wall of the lower wall, upper wall, and sidewall forming the cooling space S3. The third height L3 of the cooling space S3 formed by the third inner wall 140 is longer than the first height L1 of the temperature maintaining space S2 formed by the first inner wall 120.

The third inner wall 140 is positioned farther from the rollers 200 compared to the first inner wall 120.

The first partitioning wall 150 extends from the second inner wall 130 in the vertical direction. The first partitioning wall 150 partitions the temperature rising space S1, and the temperature may increase along the space partitioned by the first partitioning wall 150.

The second partitioning wall 160 extends from the third inner wall 140 in the vertical direction. The second partitioning wall 160 partitions the cooling space S3, and the temperature may decrease along the space partitioned by the second partitioning wall 160.

An end of the first partitioning wall 150 and an end of the second partitioning wall 160 may be positioned on an imaginary horizontal line with the second inner wall 130. That is, the first partitioning wall 150, the second inner wall 130, and the second partitioning wall 160 may be positioned on the same horizontal line.

A plurality of rollers 200 are disposed in one direction along the inner space 110 of the calcination furnace 100. The plurality of rollers 200 transfer the sagger SA containing the cathode material from the temperature rising space S1 inside the calcination furnace 100 to the cooling space S3 through the temperature maintaining space S2.

The plurality of heaters 300 includes upper heaters and lower heaters disposed in one direction along the inner space 110 with the plurality of rollers 200 interposed therebetween.

The plurality of heaters 300 include first heaters 310, second heaters 320, and third heaters 330.

The first heaters 310 are positioned inside the first inner wall 120 with the temperature maintaining space S2 interposed therebetween. The first heaters 310 have a smaller capacity than the second heaters 320 and the third heaters 330.

The second heaters 320 are spaced apart from the second inner wall 130 and positioned in the temperature rising space S1.

The third heaters 330 are spaced apart from the third inner wall 140 and positioned in the cooling space S3.

A plurality of gas feeding parts 400 are connected to the inner space 110 and supply gas GA to the inner space 110. Here, the gas GA supplied by the gas feeding parts 400 may include air and oxygen gas, but is not limited thereto.

The plurality of gas feeding parts 400 includes a first gas feeding part 410, a second gas feeding part 420, and a third gas feeding part 430.

The first gas feeding part 410 is connected to a lower part of the temperature rising space S1 and supplies the gas GA to the temperature rising space S1. The gas GA supplied from the first gas feeding part 410 to the temperature rising space S1 may be selectively exhausted to the first exhaust part 510 or the second exhaust part 520 through the temperature rising space S1, the temperature maintaining space S2, and the cooling space S3.

The second gas feeding part 420 is connected to a lower part of the temperature maintaining space S2 and supplies the gas GA to the temperature maintaining space S2. The gas GA supplied from the second gas feeding part 420 to the temperature maintaining space S2 may be selectively exhausted to the first exhaust part 510 or the second exhaust part 520 through the temperature rising space S1, the temperature maintaining space S2, and the cooling space S3.

The third gas feeding part 430 is connected to a lower part of the cooling space S3 to supply the gas GA to the cooling space S3. The gas GA supplied to the cooling space S3 from the third gas feeding part 430 may be selectively exhausted to the first exhaust part 510 or the second exhaust part 520 through the temperature rising space S1, the temperature maintaining space S2, and the cooling space S3.

A plurality of exhaust parts 500 are connected to the inner space 110 and exhaust the gas GA from the inner space 110. Here, the gas GA exhausted by the exhaust parts 500 may further include carbon dioxide gas and aqueous vapor discharged from the sagger SA in addition to the air and oxygen gas supplied by the gas feeding parts 400, but is not limited thereto.

The plurality of exhaust parts 500 includes a first exhaust part 510 and a second exhaust part 520.

The first exhaust part 510 is connected to an upper part of the temperature rising space S1 to exhaust the gas GA from the temperature rising space S1.

The second exhaust part 520 is connected to an upper part of the cooling space S3 to exhaust the gas GA from the cooling space S3.

As such, in the apparatus for calcining the secondary battery cathode material according to the embodiment, since the cross-section of the temperature maintaining space S2 is smaller than the cross-section of the temperature rising space S1 and the cross-section of the cooling space S3, the flow rate of gas GA inflowing from the outside of the sagger SA to the inside of the sagger SA in the temperature maintaining space S2 is increased compared to the cooling space S3 and the temperature rising space S1 such that the carbon dioxide gas emission from the inside of the sagger SA is improved and simultaneously the calcination reaction of the secondary battery cathode material housed in the sagger SA is improved.

Inventors of the present invention determined whether it is effective to reduce the cross-section of the inner space 110 of which section of the temperature rising section A1, temperature maintaining section A2, and cooling section A3 included in the apparatus for calcining the secondary battery cathode material. As a result of examining the calcination reaction of the cathode material accommodated in the sagger SA, it was confirmed that most of the carbon dioxide gas generated from the cathode material was generated at the temperature rising section A1, and the carbon dioxide gas generation decreased significantly from the temperature maintaining section A2. In consideration of this, in the apparatus for calcining the secondary battery cathode material according to the embodiment, the cross-section of the temperature maintaining space S2 corresponding to the temperature maintaining section A2 is smaller than that of the temperature rising space S1 and the cross-section of the cooling space S3 in order to improve carbon dioxide gas emission from inside of the sagger SA.

In addition, the inventors of the present invention determined that when the first inner wall 120 of the calcination furnace 100 is positioned on the same horizontal line as the first partitioning wall 150 and the second partitioning wall 160 to make the cross-section of the temperature maintaining space S2 smaller than the cross-section of the temperature rising space S1 and the cross-section of the cooling space S3, the first heater 310 could not be positioned in the temperature maintaining space S2 of the calcination furnace 100 such that it may not be easy to maintain the temperature of the temperature maintaining space S2. On the other hand, when an actual heating amount of the upper and lower heaters was checked during the mass production calcination furnace operation, in the actual mass production calcination process, when the predetermined temperature condition is reached and the temperature is normally maintained, it was confirmed that the internal temperature was maintained even though the heater hardly operates in the temperature maintaining space without partitioning walls. Based on this, the apparatus for calcining the secondary battery cathode material according to the embodiment, even though the cross-section of the temperature maintaining space S2 is smaller than the cross-section of the temperature rising space S1 and the cross-section of the cooling space S3, the first heater 310 with a small capacity is positioned inside the first inner wall 120 that forms the temperature maintaining space S2, and thus it is possible to maintain the temperature of the temperature maintaining space S2.

That is, in the apparatus for calcining the secondary battery cathode material according to the embodiment, the first heater 310, which has a smaller capacity compared to the second heater 320 and the third heater 330, is positioned inside the first inner wall 120 such that the cross-section of the temperature maintaining space S2 can be reduced to the maximum, thereby increasing the flow rate of gas flowing into the sagger SA in the temperature maintaining space S2 to the maximum.

Hereinafter, referring to FIG. 2 and FIG. 3, an experiment that confirmed the effects of the apparatus for calcining the secondary battery cathode material will be described.

Figure 2:
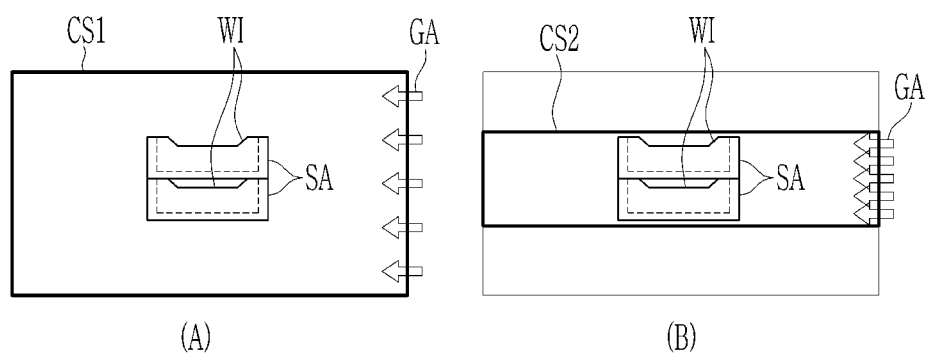
FIG. 2 shows a cross-section of a comparative example and a cross-section of an experimental example.

FIG. 2 shows a cross-section according to a comparative example and a cross-section according to an experimental example. (A) of FIG. 2 shows a cross-section according to a comparative example, and (B) of FIG. 2 shows a cross-section according to an experimental example.

The cross-section CS1, which is a comparative example shown in (A) of FIG. 2 shows the cross-section of the temperature maintaining space that is the same as the cross-section of the temperature rising space and the cross-section of the cooling space.

The cross-section CS2, which is an experimental embodiment shown in (B) of FIG. 2 shows the cross-section of the temperature maintaining space with a small cross-section compared to the cross-section of the temperature rising space and cooling space. The cross-section according to the experimental example may represent the cross-section of the temperature maintaining space when the first inner wall forming the temperature maintaining space is positioned on the same horizontal line as the end of the first partitioning wall and the end of the second partitioning wall.

Referring to FIG. 2, the case of inflow of gas GA of the same flow rate to the cross-section CS1 of the comparative example and the cross-section CS2 of the experimental example was calculated through thermal fluid computational analysis, and a ratio of gas flow rates passing through the cross-section of the window WI on the side of the sagger SA was compared. In addition, the concentration of the exhaust gas $CO_2$ that affects the calcination reaction of the cathode material accommodate in the sagger SA by the difference in the inflow gas flow rate was also compared.

FIG. 3 is a table that shows a result of the experiment of the cross-section according to the comparative example the cross-section according to the experimental example.

Referring to FIG. 3, the flow analysis result shows that, in the cross-section of the comparative example, the area of the window on the side of the sagger is only 4.25% of the entire area, and the flow rate inflow to the sagger compared to the total supply flow rate is 3.2%.

In the cross-section of the experimental example, the flow inflow to the sagger compared to the total supply flow increases to 16.6% while the area of the sagger side window increases to 18.9% of the entire area.

As a result, it was confirmed that the partial pressure of the exhaust gas $CO_2$ affecting the progress of the calcination reaction inside the sagger is decreased to less than half of the experimental example compared to the comparative example. This result shows that when the cross-section is reduced as in the cross-section according to the experimental example under the same supply flow rate, the inflow flow rate inside the sagger increases and the concentration of the exhaust gas decreases, and thus the calcination reaction of the cathode material stored in the sagger is improved.

As described above, the apparatus for calcining the secondary battery cathode material, which improves the carbon dioxide gas emission from the inside of the sagger by increasing the flow rate of gas flowing into the sagger accommodating the secondary battery cathode material, while simultaneously improving the calcination reaction of the secondary battery cathode material accommodated in the sagger, is provided.

In addition, since the calcination reaction condition is improved at the same supply air flow rate, a cathode material loading amount can be increased (increased production), or the same calcination reaction can be performed with a smaller supply air flow rate for the same cathode material loading amount (reducing operating costs) such that the apparatus for calcining the secondary battery cathode material can lower the production cost of the cathode material.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS temperature rising space S1, temperature maintaining space S2, cooling space S3, calcination furnace 100, roller 200, heater 300, gas feeding part 400, exhaust part 500

The invention claimed is:

1. An apparatus for calcining a secondary battery cathode material, comprising:
a calcination furnace including an inner space that includes a temperature rising space formed by a second inner wall, a temperature maintaining space formed by a first inner wall, and a cooling space formed by a third inner wall that are sequentially communicated with each other;
a plurality of rollers that are disposed along the inner space and transport a sagger accommodating a cathode material from the temperature rising space to the cooling space through the temperature maintaining space;
a plurality of heaters disposed along the inner space with the plurality of rollers interposed therebetween;
a plurality of gas feeding parts connected to the inner space and supplying gas to the inner space; and
a plurality of exhaust parts connected to the inner space and exhausting gas from the inner space,
wherein a cross-section of the temperature maintaining space is smaller than a cross-section of the temperature rising space and a cross-section of the cooling space,
the plurality of gas feeding parts comprise:
a first gas feeding part connected to a lower portion of the temperature rising space;
a second gas feeding part connected to a lower portion of the temperature maintaining space; and
a third gas feeding part connected to a lower portion of the cooling space,
wherein each of the first gas feeding part, the second gas feeding part, and the third gas feeding part are each communicated with the temperature rising space, the temperature maintaining space, and the cooling space, and
wherein the plurality of heaters comprise:
first heaters positioned inside the first inner wall;
second heaters positioned in the temperature rising space while being spaced apart from the second inner wall; and
third heaters positioned in the cooling space while being spaced apart from the third inner wall,
wherein the first heaters have a smaller capacity than the second heaters and the third heaters,
wherein the apparatus does not include the exhaust part in the temperature maintaining section.

2. The apparatus for calcining the secondary battery cathode material of claim 1, wherein
the first inner wall is closer to the plurality of rollers compared to the second inner wall and the third inner wall.

3. The apparatus for calcining the secondary battery cathode material of claim 2, further comprising:
a first partitioning wall that extends in a vertical direction from the second inner wall of the calcination furnace; and
a second partitioning wall that extends in the vertical direction from the third inner wall of the calcination furnace,
wherein an end of the first partitioning wall and an end of the second partitioning wall are positioned on the horizontal line with the first inner wall.

4. The apparatus for calcining the secondary battery cathode material of claim 1, wherein
the plurality of exhaust parts comprise:
a first exhaust part connected with an upper portion of the temperature rising space; and
a second exhaust part connected with an upper portion of the cooling space.

* * * * *